G. F. VOIGHT.
VEHICLE SPRING SUSPENSION.
APPLICATION FILED OCT. 7, 1918.
1,412,585.
Patented Apr. 11, 1922.
2 SHEETS—SHEET 1.
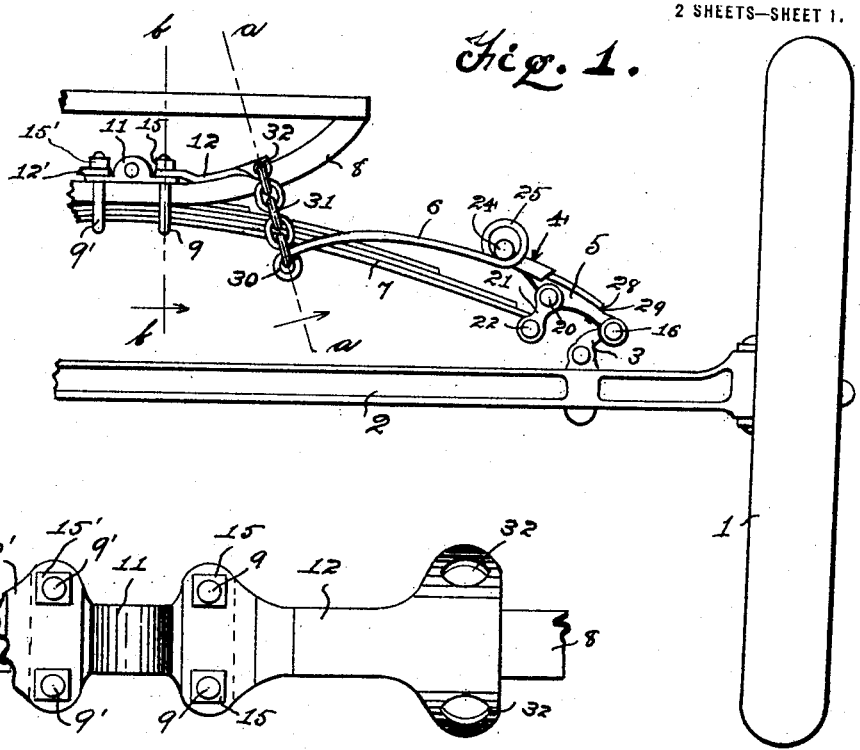
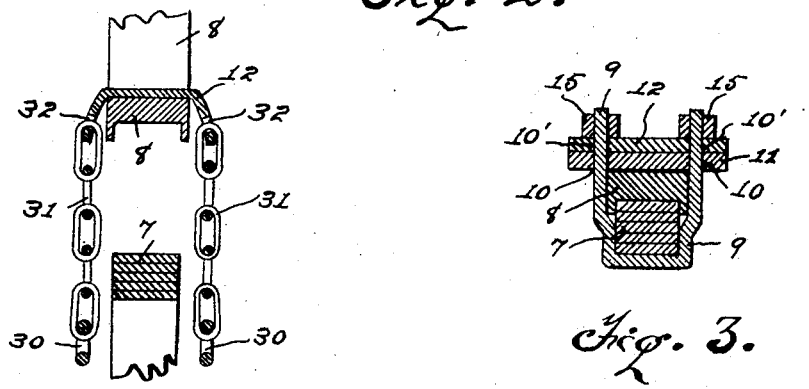
INVENTOR,
George F. Voight.

G. F. VOIGHT.
VEHICLE SPRING SUSPENSION.
APPLICATION FILED OCT. 7, 1918.
1,412,585.
Patented Apr. 11, 1922.
2 SHEETS—SHEET 2.
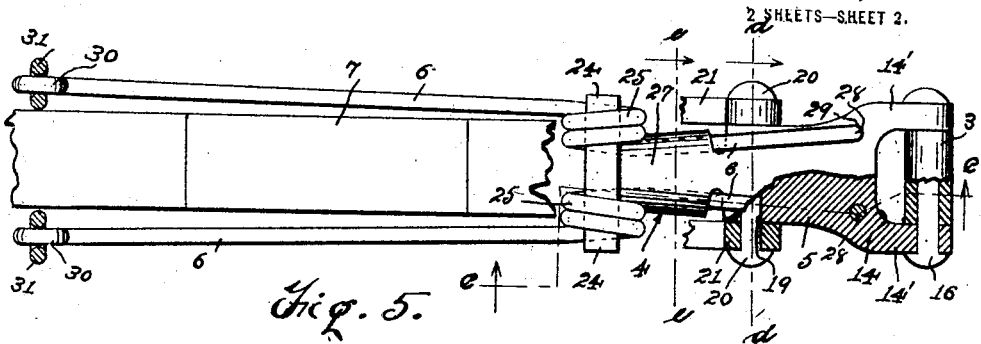
Fig. 5.
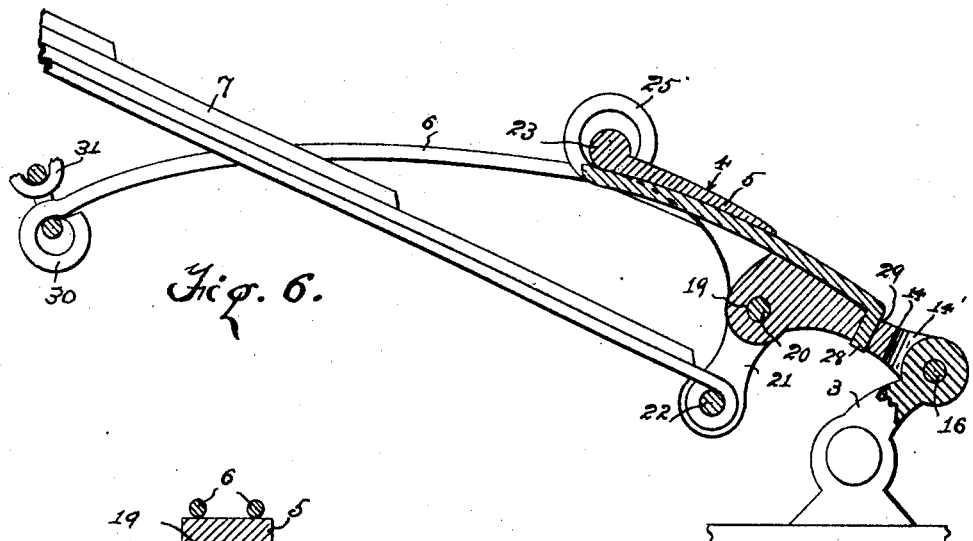
Fig. 6.
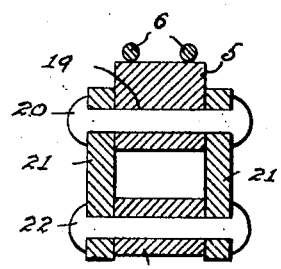
Fig. 7.
Fig. 8.
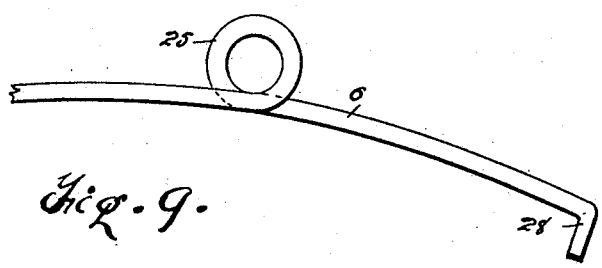
Fig. 9.
INVENTOR,
George F. Voight.

UNITED STATES PATENT OFFICE.

GEORGE F. VOIGHT, OF SAN FRANCISCO, CALIFORNIA, ASSIGNOR TO WALTER S. BURGESS, OF OAK PARK, ILLINOIS.

VEHICLE SPRING SUSPENSION.

1,412,585. Specification of Letters Patent. Patented Apr. 11, 1922.

Application filed October 7, 1918. Serial No. 257,225.

*To all whom it may concern:*

Be it known that I, GEORGE F. VOIGHT, a citizen of the United States, residing at San Francisco, in the county of San Francisco and State of California, have invented new and useful Improvements in Vehicle Spring Suspensions, of which the following is a specification, reference being had therein to the accompanying drawings.

This invention relates to improvements in auxiliary springs for vehicles of that type embracing vertically oscillatory resilient levers which are pivotally supported at their outer ends by the vehicle's running gear and connected at their inner ends to a portion of the vehicle subject to rebound, and provided with means between their ends for connection to main vehicle's leaf springs in such a way as to absorb minor shocks which are too light to flex the main spring and thereby produce, when combined, a smooth operating carrying spring structure.

An object of my invention is to provide a light, strong and efficient device of the nature mentioned to assist the leaf spring to cushion the vehicle against the unevenness of the road and to check recoil, and the invention resides in the combination and arrangement of parts and in the details of construction hereinafter described and claimed.

In the drawings:—

Figure 1 is an end view in elevation of the left-hand side of the front end of a vehicle, showing my invention applied thereto.

Figure 2 is a plan view of a part of the device; also showing a fragment of the vehicle frame.

Figure 3 is a vertical sectional view on line $b-b$, Fig. 1.

Figure 4 is a sectional view on line $a-a$, Fig. 1.

Figure 5 is a top view of a portion of the invention, portions being in section; also showing a fragment of the vehicle's leaf spring.

Figure 6 is a side view of the present invention on line $c-c$, Fig. 5.

Figure 7 is a view on line $d-d$, Fig. 5.

Figure 8 is a view on line $e-e$, Fig. 5.

Figure 9 is a fragmentary view of the device.

Like and corresponding parts throughout the several figures and views are designated and referred to by like reference numerals.

Referring now to the drawings:—

1 designates a vehicle wheel supporting one end of an axle 2 provided with a familiar form of perch 3.

4 designates a vertically oscillatory lever that is pivoted at its outer end to the perch 3. It comprises an outer rigid section 5 and a pair of inwardly extending resilient arms 6. Said arms are laterally spaced and are disposed one on each side of the main leaf spring 7, shown as of the known Ford type; and they are supported at their inner ends by a bar 8, shown as constituting part of the body frame subject to rebound, by a flexible member 31, as will be hereinafter described.

The cross-bar is secured to the main spring 7 by clips 9, 9', the upper or free ends of which extend into openings 10, 10' of a central crank bearing 11 and the inner ends of saddle-plates 12, 12'. The clips 9, 9' are drawn into position to lock the parts together by nuts 15, 15'.

The invention, shown as applied to the front spring (a portion of which and its associate parts are shown in Figure 1), can also be applied to the rear spring. The outer rigid section of the lever 4 is forked to provide a pair of ears 14' which overlap and are hinged to the perch by the hinge or pivot pin 16, as best shown in Figures 1 and 2. Said section 5 has between the ends a downwardly extending lug pierced to form a transverse opening 19 through which extends a pivot pin 20. Said pin 20 supports shackle links 21, to the lower ends of which are connected by the bolts 22 the outer end of the main spring 7.

The inner end of the section 5 has a horizontal T-head 23, forming at its ends a pair of trunnions 24. About these trunnions are wound flexible coils 25 that are formed as parts, and between the ends of the resilient arms 6, before mentioned. The parts of said arms, outwardly beyond the coils, lie in downwardly opening grooves 26 in the lower side of the portion 27 of the rigid section 5 adjacent to the free or inner end thereof, as indicated in Figures 5 and 7. The extreme outer ends of the arms 6 are bent downwardly to form terminals 28 which are seated in openings 29 of the section 5, near the hinged end of the latter. The grooved inner end portions 27 of the section 5 overhang the arms 6, and constitute, with the hook terminals 28 that enter the upper open ends of the openings 29, means to relatively lock the members 6 and 5 together. This construction provides a ready means of detachably securing the resilient members of the arm 4 to the fixed section or member thereof, and one which firmly holds said resilient members in place.

The inner ends of the arms 6 are coiled to form hooks 30 adapted to receive the lower ends of the flexible members 31. Said flexible members are shown as having the form of chains, and the upper ends of said chains are secured to eyes 32 in the outer or free ends of the saddle-plates 12, before mentioned. The inner ends of the flexible members are thus flexibly secured by the flexible members to a portion of the vehicle body subject to rebound.

The construction and the arrangement of the parts forming the present invention are intended to be such that the inner end of the section 5 can move downwardly against the resiliency of the arms 6 and coils 25 (which latter increase the resiliency of the arms) thereby yieldingly supporting the outer end of the spring 7 on the perch 3, so that the auxiliary spring arms can come into action preliminary to flexion of the main spring and continue action during such flexion. The shackle connection between the outer end of the spring 7 and the section 5 permits a certain amount of longitudinal movement of said spring relatively to said section 5 upon flexion of the said main spring. The flexible suspension elements 31, being constructed of a plurality of links, are quite flexible and offer substantially no resistance to the movements of the cross-bar 8 relatively to the arms 6. Therefore, the auxiliary spring arm is exceedingly sensitive to light road shocks, and gently merges its progressively stiffer action with the flexion of the main spring, thereby producing a compound spring structure which is mutually active and which progressively and uniformly merges its action into the heaviest duty of the structure.

I claim:

1. In a spring suspension for vehicles an oscillatory lever comprising an outer rigid section adapted to be pivotally and directly connected to a part fixed relatively to the axle of the vehicle and an inwardly extending resiliently flexible section embracing a scroll between the inner end of the rigid section and the free end of its resilient section, a link connection between the free end of said resilient section and a portion of the vehicle subject to rebound, and a link adapted to connect one end of the vehicle's leaf spring and said lever intermediate its ends.

2. The combination with a vehicle having an axle and a leaf spring disposed above said axle and extending in a general direction therewith, of an oscillatory lever comprising an outer nonflexible section pivotally supported by said axle and an inwardly extending section comprising a pair of resiliently flexible spaced apart arms, each of said arms having a coiled section intermediate its ends, a connection between the free ends of said arms and a portion of the vehicle movable relatively to said axle, and a connection between one end of said leaf spring and said nonflexible section.

3. In a spring suspension of the nature described, the combination with a vehicle having a movable support and a relatively stationary support, of a lever comprising a rigid member having its outer end pivotally connected to said stationary support and a pair of flexible arms having their inner ends movably connected to said movable support, a coiled section in each of said arms adjacent their outer ends, a substantially rigid connection between the outer ends of said arms and said rigid member, and a shackle connection between one end of the vehicle's leaf spring and said rigid member.

4. The combination with a vehicle having an axle and a leaf spring disposed above said axle and extending in a general direction therewith, of an oscillatory lever comprising an outer rigid section pivotally attached to said axle and an inner section comprising a pair of resilient arms, each embracing a scroll inside the end of the leaf spring, a link connection between the free ends of said arms and the vehicle body, and a shackle connection between the rigid section and one end of said leaf spring.

5. A spring suspension for the purpose set forth comprising a lever having an outer rigid section, having means to adapt it for pivotal connection to a part on a vehicle axle, and having means between its ends to adapt it to swingingly support one end of a main vehicle spring, said lever also embracing laterally spaced resilient arms formed with coils to increase their resiliency, and adapted at their inner ends for connection to a part of a vehicle subject to rebound relatively to the vehicle axle.

6. A spring suspension for the purpose set forth comprising a lever having an outer rigid section, having means to adapt it for pivotal connection to a part on a vehicle axle, and having means between its ends to adapt it to swingingly support one end of a main vehicle spring, said lever also embracing laterally spaced resilient arms formed with coils to increase their resiliency, and flexible members connected to the inner ends of said arms and adapted for connection to a part of a vehicle subject to rebound relatively to the axle.

7. A spring suspension device comprising an arm embracing a rigid member adapted for pivotal connection to a vehicle running gear, and adapted between its ends for connection to a main vehicle spring, and embracing also separately formed laterally spaced resilient members having between their ends spring coils adapted for interlocking engagement with the said rigid member and provided at their ends with means to connect them to a vehicle body.

GEORGE F. VOIGHT.